US010099556B2

United States Patent
Connolly et al.

(10) Patent No.: US 10,099,556 B2
(45) Date of Patent: Oct. 16, 2018

(54) DUAL STACKABLE MODULE SUPPORT FOR VEHICLE

(71) Applicants: Christopher R Connolly, Highland, MI (US); Paul B McCormick, Rochester, MI (US)

(72) Inventors: Christopher R Connolly, Highland, MI (US); Paul B McCormick, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 267 days.

(21) Appl. No.: 15/214,741

(22) Filed: Jul. 20, 2016

(65) Prior Publication Data
US 2018/0022216 A1    Jan. 25, 2018

(51) Int. Cl.
*B60K 37/02* (2006.01)
*B60R 11/02* (2006.01)
*B60R 11/00* (2006.01)

(52) U.S. Cl.
CPC .............. *B60K 37/02* (2013.01); *B60R 11/02* (2013.01); *B60R 11/0264* (2013.01); *B60K 2350/92* (2013.01); *B60K 2350/94* (2013.01); *B60R 2011/0005* (2013.01)

(58) Field of Classification Search
CPC ...... B60K 37/02; B60R 11/02; B60R 11/0264
USPC .............................................. 296/70; 180/90
See application file for complete search history.

(56) References Cited

U.S. PATENT DOCUMENTS

| 5,479,693 | A   | * | 1/1996 | Oyama ................. B60K 37/00 180/90 |
| 6,843,521 | B1  | * | 1/2005 | Oana .................... B62D 25/145 180/90 |
| 7,401,835 | B2  |   | 7/2008 | Gresham et al. |
| 7,926,845 | B2  |   | 4/2011 | Sato |
| 2004/0145208 | A1 |   | 7/2004 | Kapteyn |
| 2005/0050927 | A1 | * | 3/2005 | Kapteyn ............... B60K 35/00 70/237 |
| 2006/0145497 | A1 |   | 7/2006 | Stack et al. |
| 2009/0024275 | A1 |   | 1/2009 | Hayes et al. |
| 2013/0058014 | A1 |   | 3/2013 | Charles |

* cited by examiner

*Primary Examiner* — Joseph D. Pape
(74) *Attorney, Agent, or Firm* — Ralph E. Smith

(57) ABSTRACT

A module support bracket for a vehicle instrument panel includes a first module receiving surface defining an internal aperture, the first module receiving surface configured to receive a first module, and a second module receiving surface arranged within the internal aperture on a different plane than the first module receiving surface. The second module receiving surface is configured to receive a second module in a stacked relationship to the first module. The second module is configured to be inserted through an opening in the instrument panel in an installation direction to couple the second module to the second module receiving surface. The first module is subsequently inserted through the opening in the instrument panel in the installation direction to couple the first module adjacent the second module in a compact arrangement.

18 Claims, 10 Drawing Sheets

FIG. 13

DUAL STACKABLE MODULE SUPPORT FOR VEHICLE

FIELD

The present application relates generally to arrangement of vehicle interior electronics and, more particularly, to a support for stacking multiple modules, such as electronics modules, within a vehicle interior.

BACKGROUND

Instrument panels or dashboards for motor vehicles generally include a center stack that supports various controls and interior features. Typical center stacks may include entertainment systems, navigation systems, sound system controls, HVAC climate controls, air vents our outlets, or other controls and features. The center stack is typically covered with a front plate or trim bezel. Because space is limited in the region of the instrument panel and center stack, electronics modules associated with the controls/features on the center stack may be located remote from the center stack. However, the controls remain associated with the center stack and are accessible to the occupants seated in the front of the passenger cabin. The controls may be connected to the actual components or modules via wires or a wireless connection.

With the increase in controls/features of today's newer vehicles, packaging space in the instrument panel and center stack has become increasingly limited. Moreover, multiple components of the vehicle may need to be removed to access or service one or more of the modules associated with the controls/features. Further, each module is typically secured separately to the vehicle via one or more individual supports, thereby increasing the number of components of the vehicle and resulting in increased cost and weight. Thus, while such systems work for their intended purpose, there remains a need to improve component packaging within a vehicle.

SUMMARY

In one exemplary aspect of the invention, a module support bracket for an instrument panel of a vehicle is provided. In one example implementation, the module support bracket includes a first module receiving surface defining an internal aperture, the first module receiving surface configured to receive a first module, and a second module receiving surface arranged within the internal aperture on a different plane than the first module receiving surface. The second module receiving surface is configured to receive a second module in a stacked relationship to the first module. The second module is configured to be inserted through an opening in the instrument panel in an installation direction to couple the second module to the second module receiving surface. The first module is subsequently inserted through the opening in the instrument panel in the installation direction to couple the first module adjacent the second module in a compact arrangement.

In another exemplary aspect of the invention, a vehicle is provided. The vehicle includes an instrument panel, a structural member extending laterally across the vehicle behind the instrument panel, a vehicle component disposed in the instrument panel, a first electronics module, and a second electronics module. A module support bracket is disposed behind the vehicle component and coupled to the structural beam. The module support bracket includes a first module receiving surface defining an internal aperture, the first module receiving surface configured to receive the first module, and a second module receiving surface arranged within the internal aperture on a different plane than the first module receiving surface. The second module receiving surface is configured to receive the second module in a stacked relationship to the first module. Upon removing the vehicle component, the second module is inserted through an opening in the instrument panel in an installation direction to couple the second module to the second receiving surface. The first module is subsequently inserted through the opening in the instrument panel in the installation direction to couple the first module to the support bracket adjacent the second module in a compact, stacked arrangement such that the first and second modules are positioned behind the vehicle component.

DESCRIPTION

Figure 1:
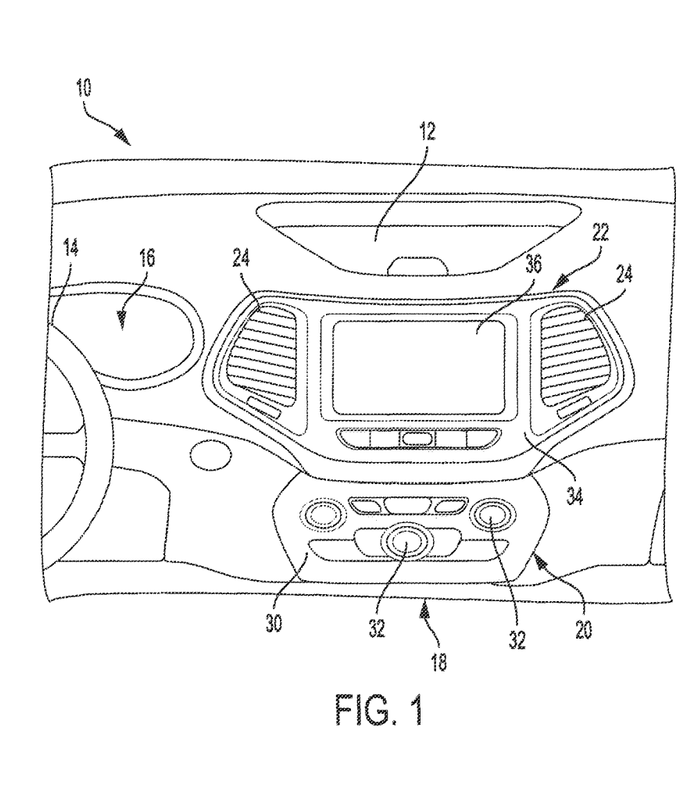
FIG. 1 is a front view of an example vehicle instrument panel in accordance with the principles of the present application.

With initial reference to FIG. 1, an example vehicle instrument panel is illustrated and generally identified at reference numeral 10. The vehicle instrument panel 10 includes a center stack having a module support bracket 100 configured to allow multiple electronics or control modules to couple to the same support bracket. The module support bracket 100 enables the modules to be attached adjacent each other to allow service of the modules through the same opening, thereby reducing cost and time removing other components to extract the modules for service. Accordingly, a single module support bracket may be used to support multiple modules, thereby reducing cost and weight by obviating the need for individual support brackets for each module.

Figure 2:
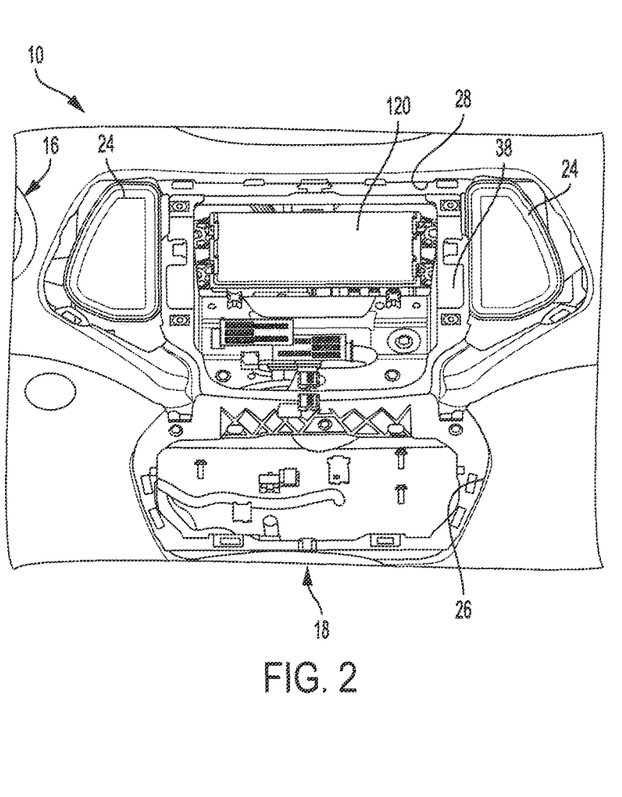
FIG. 2 is a front view of the instrument panel shown in FIG. 1 with a control panel faceplate and center stack bezel removed, in accordance with the principles of the present application.
Figure 3:
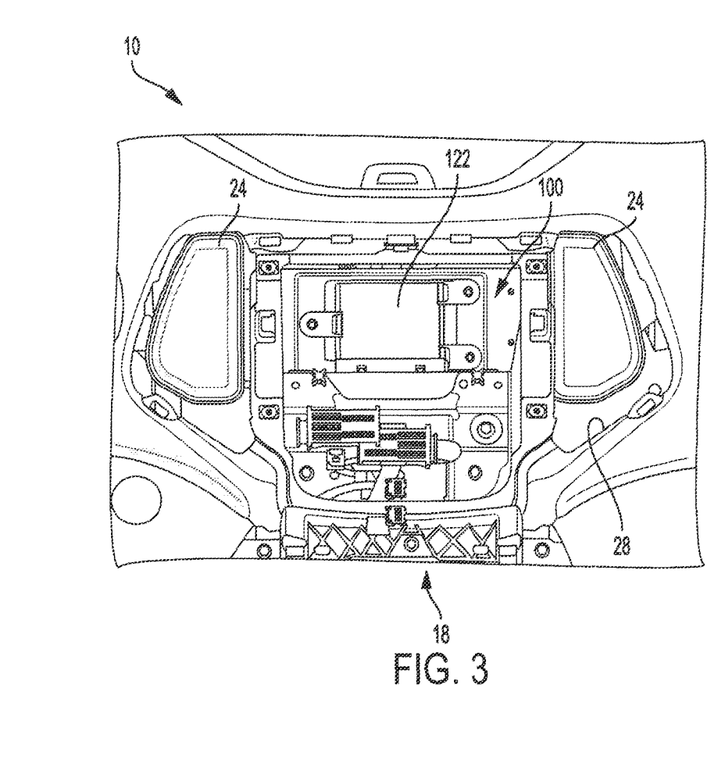
FIG. 3 is a front view of the instrument panel shown in FIG. 2 with a first example module removed, in accordance with the principles of the present application.

With additional reference to FIGS. 2 and 3, the vehicle dashboard or instrument panel 10 generally includes a steering wheel 14, an instrument cluster 16, and a center stack 18. Steering wheel 14 is configured to be utilized by a driver to steer the vehicle, and instrument cluster 16 may include one or more displays configured to provide information to the driver such as, for example, vehicle speed, engine rotational speed, or current transmission gear. In the example embodiment, center stack 18 is configured to house one or more vehicle components/controls and is located between the driver and front passenger seats (not shown) of a vehicle seating area. The center stack 18 is exposed to the cabin space of the vehicle and is oriented for use by a driver/passenger of the vehicle.

As shown in FIG. 1, center stack 18 generally includes a control panel 20, an infotainment system 22, and heating ventilation and air conditioning (HVAC) vents 24. As shown in FIG. 2, instrument panel 10 defines a first opening 26 configured to receive the control panel 20, and a second opening 28 configured to receive infotainment system 22 and HVAC vents 24. However, center stack 18 may be arranged in various other configurations and is configured to receive any suitable components/controls useful for vehicle operation or passenger convenience. In addition, a storage bin or compartment 12 may be defined in the instrument panel 10 and located above the center stack 18.

In the example embodiment, control panel 20 includes a control panel faceplate 30 and one or more controls 32 (FIG. 1) exposed to the cabin space of the vehicle and configured to control various components or functions of the vehicle. For example, controls 32 may control a vehicle HVAC system, a vehicle sound system, a radio, a CD/DVD player, an auxiliary connected device, and/or a vehicle seat heating/cooling system. However, control panel 20 may include any suitable controls for operating or controlling various components or functions of a vehicle.

As shown in FIG. 1, a center stack bezel 34 is positioned within second opening 28 and about infotainment system 22 and HVAC vents 24 so as to be exposed to the cabin space of the vehicle. The infotainment system 22 may include a display or user interface 36, which is configured to provide audio/visual information about the vehicle to the driver. For example, the user interface 36 may be a touch-screen configured to display one or more soft keys programmed to perform a specific function when selected. In one example implementation, the soft keys may be selected by the driver to choose various multimedia applications and vehicle functions such as navigation, connected phone control, AM/FM and satellite radio, and internet connected applications. Additionally, user interface 36 may provide audio communications to the driver in place of or in addition to visual displays. Moreover, the user interface 36 may also receive audio commands from the driver. However, the user interface 36 is not limited solely to the function described herein and may be utilized in various other ways to control vehicle systems.

Figure 4:
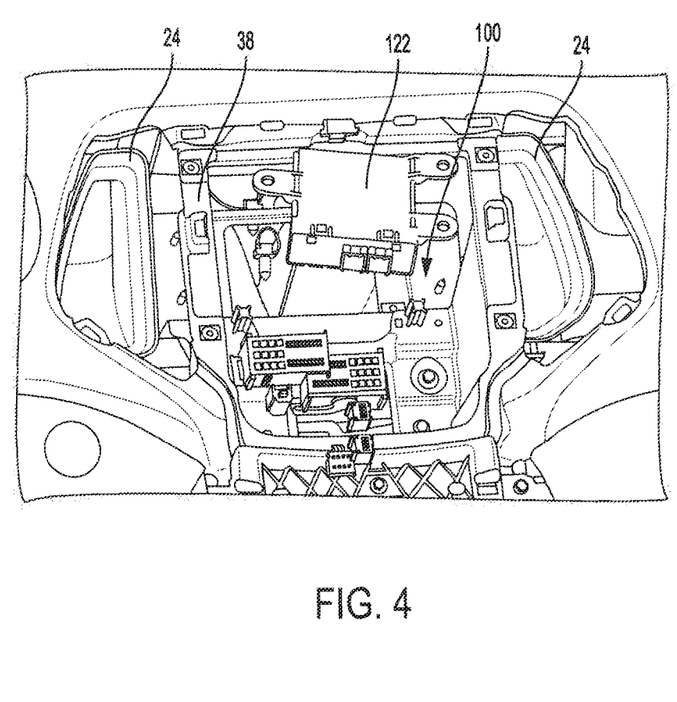
FIG. 4 is a front view of the instrument panel shown in FIG. 3 with a second example module being removed, in accordance with the principles of the present application.

As shown in FIGS. 2-4, center stack 18 includes a retainer 38 disposed between HVAC vents 24 and configured to receive and support infotainment system 22 and/or additional vehicle components. As such, retainer 38 may include various features such as slots 60 configured to receive portions of system 22 to removably secure system 22 (or other components) to retainer 38. In the example embodiment, retainer 38 is coupled to a support panel 40 of a structural member or cross-car beam 42 (see FIG. 10) via fasteners 44 (FIG. 9) inserted through one or more apertures 46 (FIG. 11) of the retainer 38.

Figure 5:
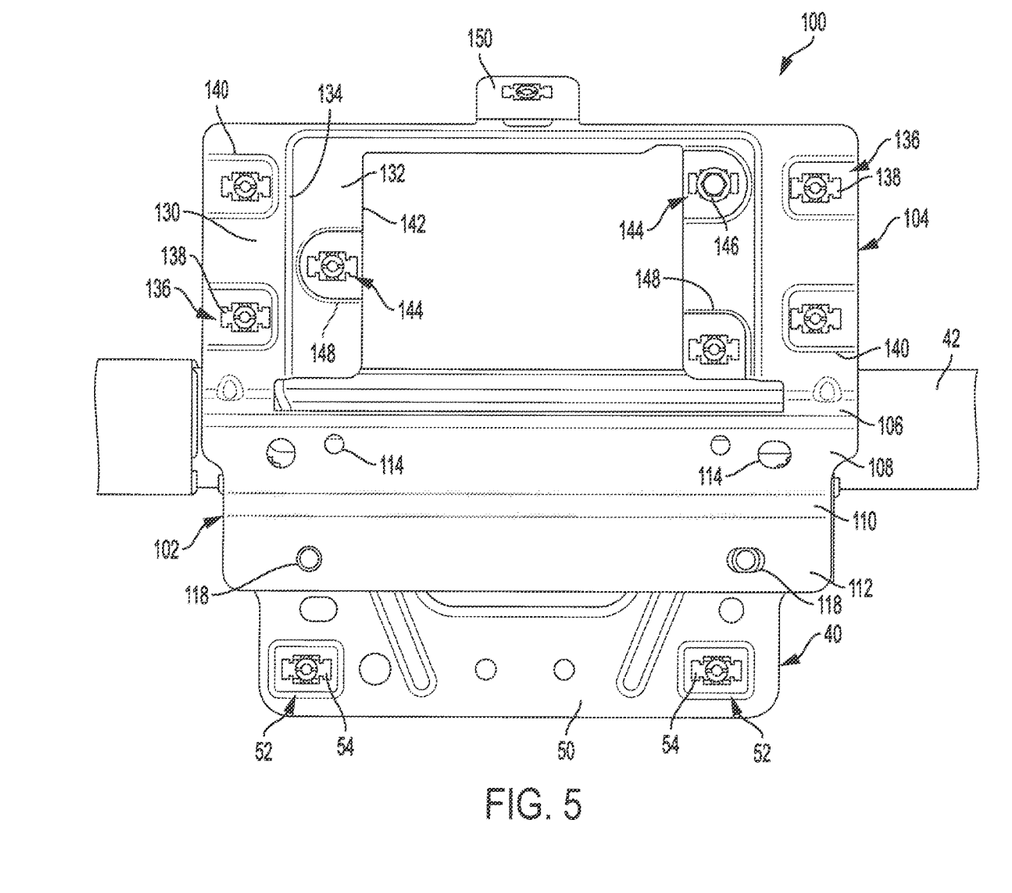
FIG. 5 is a front view of an example dual module support bracket in accordance with the principles of the present invention.
Figure 7:
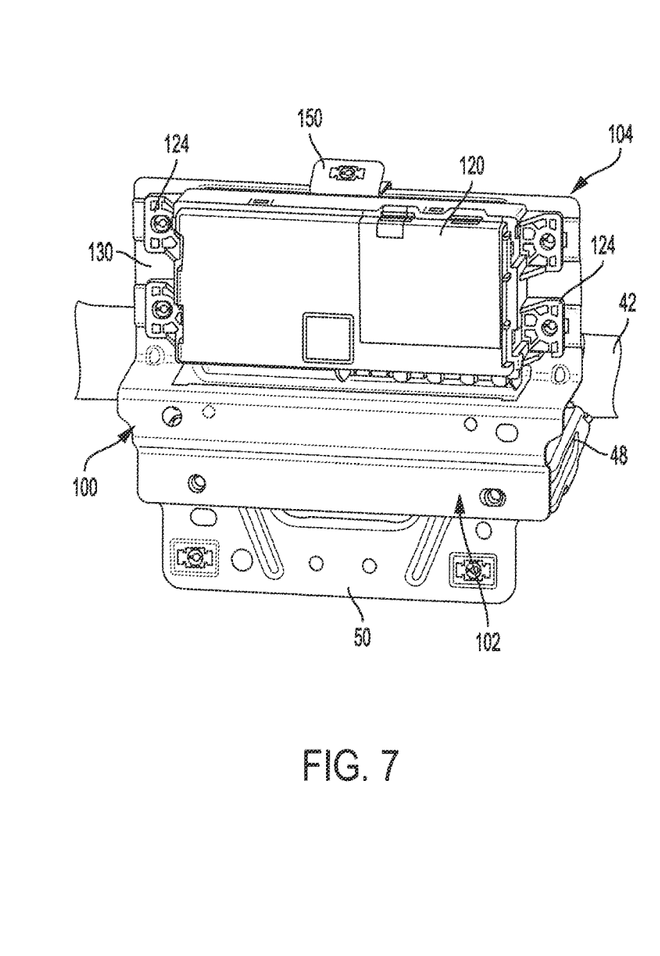
FIG. 7 is a front perspective view of the dual module support bracket shown in FIG. 5 with another module installed in accordance with the principles of the present application.
Figure 9:
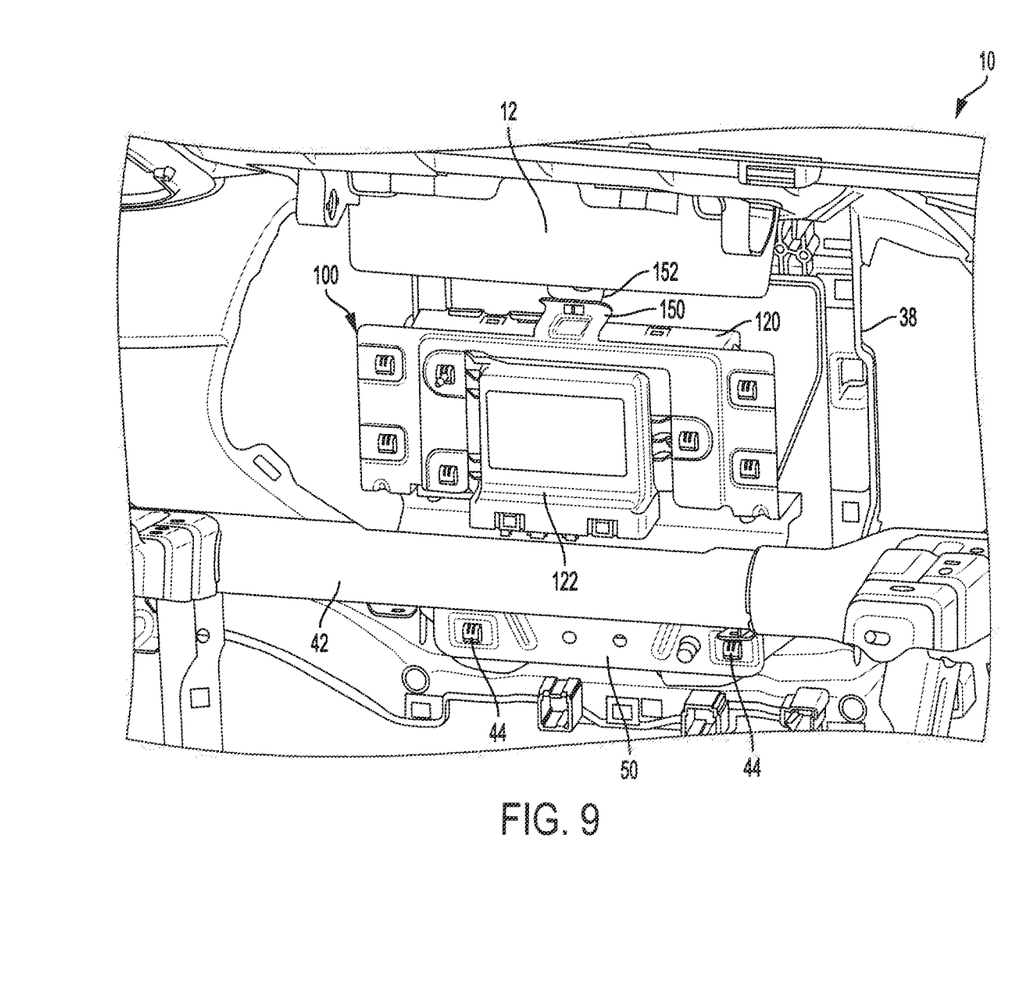
FIG. 9 is a rear perspective view of example vehicle instrument panel and dual module support bracket from a vehicle engine side in accordance with the principles of the present application.
Figure 10:
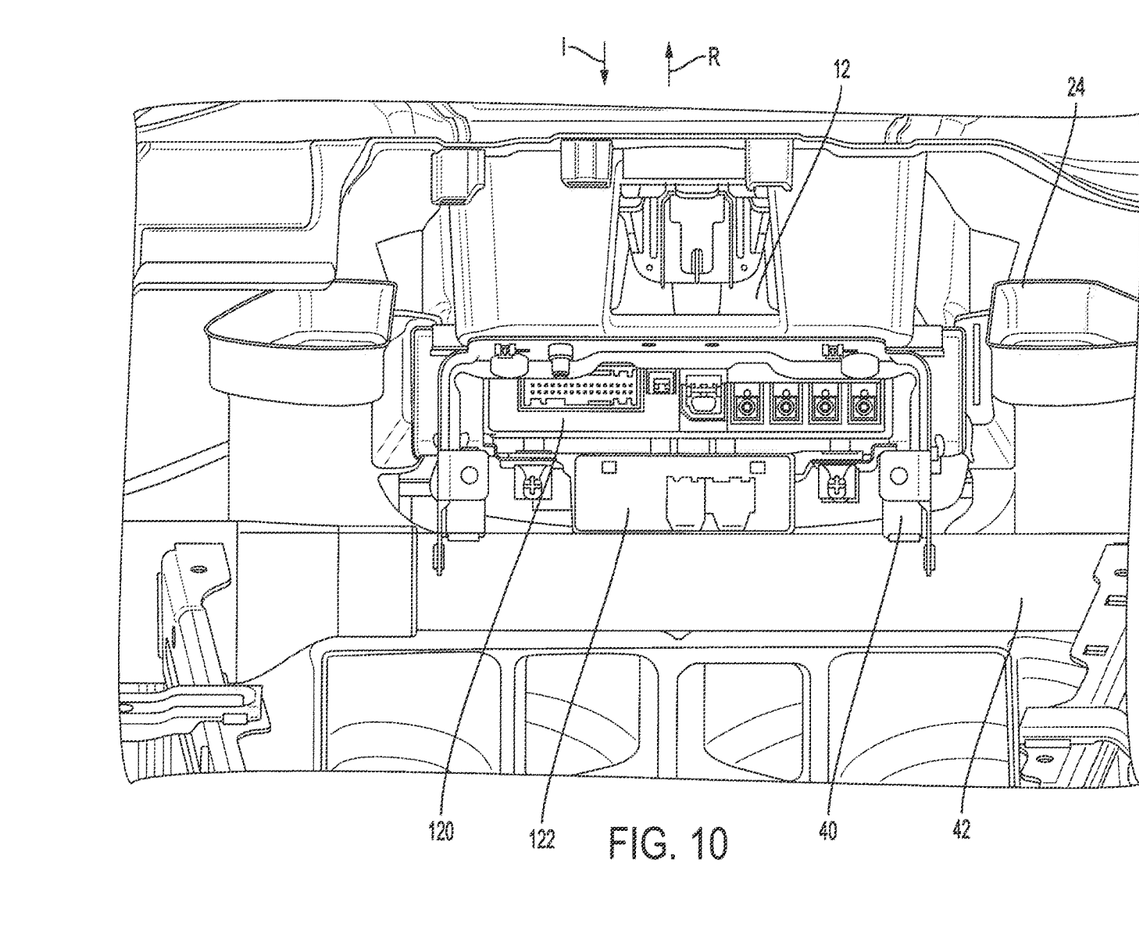
FIG. 10 is a bottom view of the instrument panel shown in FIG. 9 in accordance with the principles of the present application.

As shown, for example in FIGS. 7 and 9, the cross-car beam 42 is a structural beam formed of a rigid material that extends behind the instrument panel 10 laterally across the vehicle. The cross-car beam 42 is configured to support various vehicle components such as the instrument panel 10 and a steering column (not shown). The support panel 40 is coupled to cross-car beam 42 and extends therefrom generally toward a rear of the vehicle. In the example embodiment, the support panel 40 includes a pair of support arms 48 extending from a plate member 50 toward the cross-car beam 42 and coupled thereto. As shown in FIG. 5, plate member 50 includes one or more fastener features 52 (e.g., openings) configured to receive fasteners 54 so as to couple retainer 38 to the support panel 40 and thus cross-car beam 42.

Now with additional reference to FIGS. 5-13 module support bracket 100 will be described. As described herein, the module support bracket 100 includes a stepped design configured to simultaneously support multiple electronics modules. In this way, the modules are arranged in close proximity in a compact side-by-side fashion to provide maximum usage of available package space behind the instrument panel 10. As such, a single module support bracket 100 is utilized to secure the modules to vehicle supports (e.g., cross-car beam 42), thereby avoiding the need for multiple brackets to secure each individual module. In the example embodiment, module support bracket 100 is disposed within the instrument panel 10 behind the infotainment system 22. As will be described herein in more detail, module support bracket 100 is disposed within the center stack 18 and located such that only minimal component removal is required to access the module support bracket 100. Two modules are coupled to the module support bracket 100 side-by-side such that removal of one of the modules provides access to the other module. Accordingly, both modules may be removed through the same opening in the same service direction generally toward the rear of the vehicle, thereby saving time and energy when servicing or replacing the modules.

In the example embodiment illustrated in FIG. 5, module support bracket 100 generally includes a securing portion 102 and a module receiving portion 104. The securing portion 102 is configured to secure bracket 100 to a vehicle support structure and extends outwardly from module receiving portion 104 generally toward a rear of the vehicle when in the installed position.

In the illustrated example, securing portion 102 generally includes an outwardly extending portion 106, a first front face portion 108, a rearwardly extending portion 110, and a second front face portion 112. This particular configuration provides increased stability of module support bracket 100. However, it will be appreciated that securing portion 102 may have various other configurations depending on the type of vehicle, surrounding vehicle structure, and/or attachment options available in the vehicle.

Figure 6:
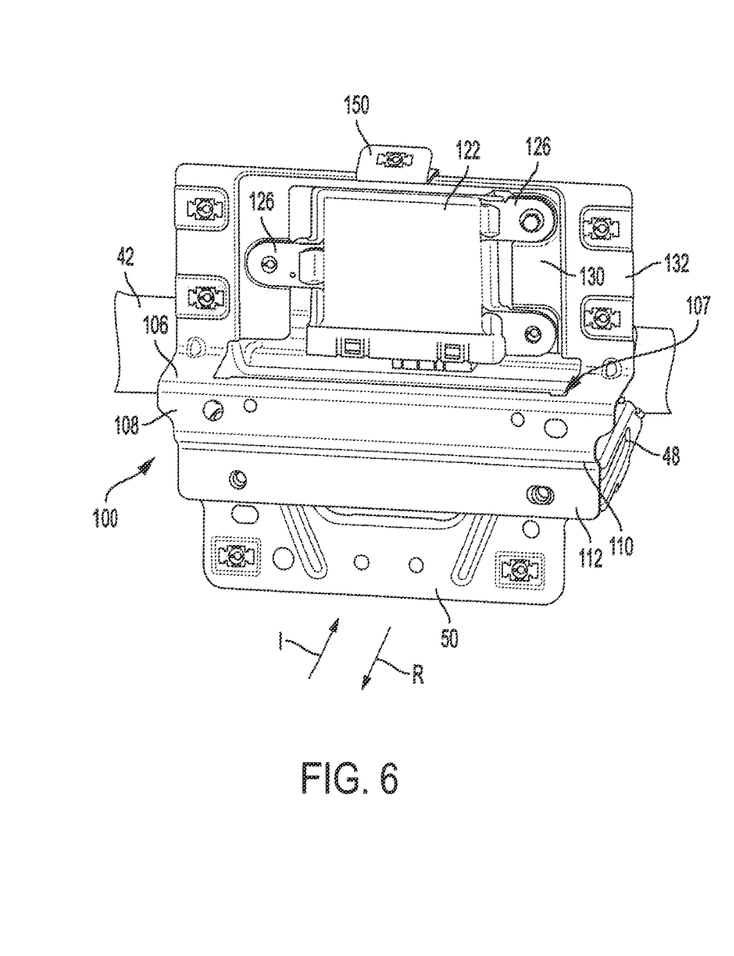
FIG. 6 is a rear perspective view of the dual module support bracket shown in FIG. 5 with one module installed in accordance with the principles of the present application.

In the example embodiment, outwardly extending portion 106 is coupled to and extends outwardly from module receiving portion 104. As shown in FIGS. 6 and 7, an opening 107 may be formed therein to provide wired connection access to the modules. First front face portion 108 is coupled between outwardly extending portion 106 and rearwardly extending portion 110 and is oriented perpendicular to or substantially perpendicular thereto. As shown in FIG. 5, first front face portion 108 includes a plurality of apertures 114 configured to couple bracket 100 between retainer 38 and support panel 40 and/or to receive locating features (not shown) to locate the bracket 100 to the retainer 38. In one example embodiment shown in FIG. 13, an opening 116 may be formed therein to provide wired connection access to the modules. Rearwardly extending portion 110 is coupled between first front face portion 108 and second front face portion 112 and is oriented perpendicular to or substantially perpendicular thereto.

Second front face portion 112 extends generally downwardly from the rearwardly extending portion 110 and is configured to be oriented against the support panel 40, which is coupled to cross-car beam 42. As such, second front face portion 112 includes a plurality of apertures 118, which are configured to align with receiving apertures 56 (see FIG. 6) formed in plate member 50. A fastener 58 (see FIG. 8) may be inserted through each aligned pair of apertures 56, 118 to secure module support bracket 100 to the cross-car beam 42.

Figure 8:
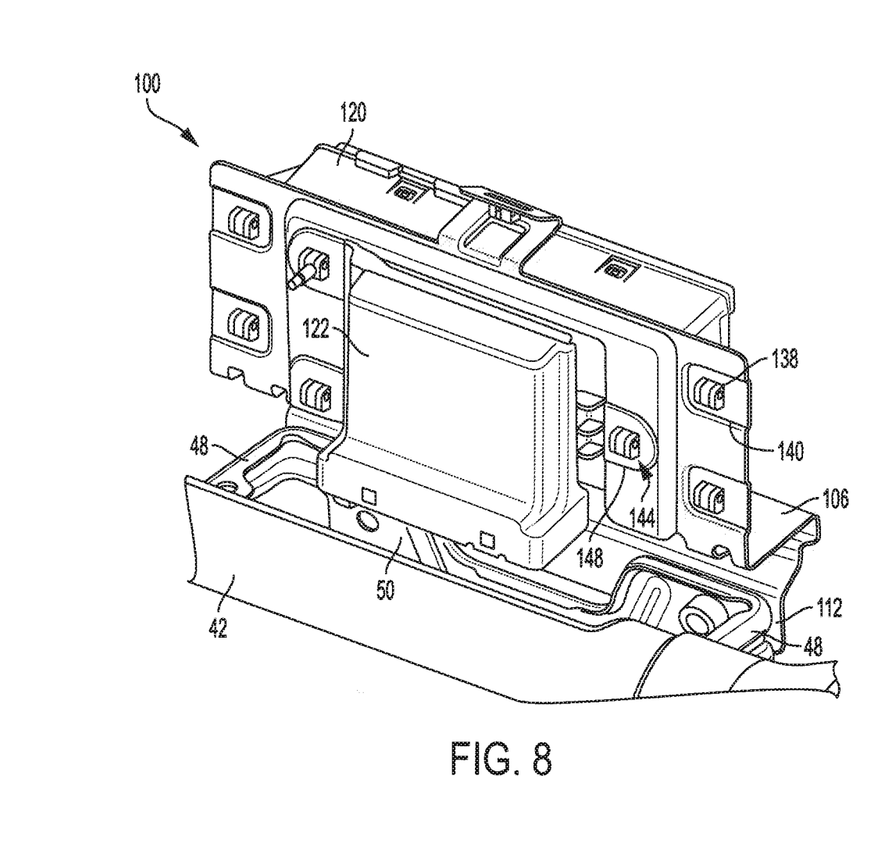
FIG. 8 is a rear perspective view of the dual module support bracket shown in FIG. 5 with both modules installed in accordance with the principles of the present application.

With further reference to FIGS. 6-8, module receiving portion 104 is configured to receive a first module 120 and a second module 122 such that modules 120, 122 are arranged in a compact side-by-side configuration (see FIG. 8). In one example, the first module 120 is an emergency call device such as a telematics box module (TBM), and the second module 122 is a gateway. However, it will be appreciated the modules 120, 122 may be any suitable module for a vehicle.

In the example embodiment, module receiving portion 104 is stepped to define a first module receiving surface 130 that is offset or spaced apart from a second module receiving surface 132 such that surfaces 130, 132 are oriented on different planes. Moreover, the first module receiving surface 130 defines an internal aperture 134 within which is positioned the second receiving surface 132. In the example embodiment, first and second receiving surfaces 130, 132 are parallel or generally parallel. However, module surfaces 130, 132 or even additional module surfaces may be oriented at various angles to accommodate and receive a module.

The first receiving surface 130 may include a plurality of receiving fixtures or apertures 136 configured to receive fasteners 138 configured to couple the first module 120 to the first receiving surface 130. Moreover, steps or offsets 140 may be formed (e.g., stamped) in first receiving surface 130 around each receiving aperture 136. In addition, a coupling tab 150 may be coupled to first receiving surface 130 and extend upwardly therefrom. As shown in FIG. 9, coupling tab 150 may be coupled to a portion 152 of the storage bin 12 to further secure module support bracket 100 within the instrument panel 10.

The first module 120 may include attachment tabs or legs 124 configured to rest against the offsets 140. In the illustrated example, first module 120 includes four attachment legs 124. However, it will be appreciated that first receiving surface 130 can be designed to accommodate various numbers of attachment legs 124 or other attachment features depending on the architecture of the first module 120. Once secured to the first receiving surface 130, it can be seen that the first module 120 extends across the internal aperture 134 such that it is arranged adjacent to the second module 122. Accordingly, first module 120 must be removed to access the second module 122.

As shown in the example embodiment, the second receiving surface 132 is stepped or offset from the first receiving surface 130 and is arranged generally within the outline of the internal aperture 134. The stepped, second receiving surface 132 may be formed, for example by stamping the first receiving surface 130, thereby resulting in the illustrated configuration. The second receiving surface 132 defines an internal opening 142 configured to receive at least a portion of the second module 122 therethrough (see FIG. 8). In this way, the second module 122 can be coupled to the second receiving surface 132 and extend outwardly therefrom.

The second receiving surface 132 may include a plurality of receiving fixtures or apertures 144 configured to receive fasteners 146 to couple the second module 122 to the second receiving surface 132. Moreover, steps or offsets 148 may be formed (e.g., stamped) in second receiving surface 132 around each receiving aperture 144. As such, the second module 122 may include attachment tabs or arms 126 configured to be positioned against the offset 146 within the depression formed thereby. In this way, the attachment arms 126 may be oriented so as to be flush or generally flush with the second receiving surface 132. In the illustrated example, second module 122 includes three attachment arms 126. However, it will be appreciated that second receiving surface 132 can be designed to accommodate various numbers of attachment arms 126 or other attachment features depending on the architecture of the second module 122. Once secured to the second receiving surface 132, the second module 122 extends away from one side of the module support bracket 100. This allows subsequent attachment of the first module 120 to the first receiving surface 130 such that the first module 120 is arranged adjacent to the second module 122 and extends away from the opposite side of the module support bracket 100. Accordingly, both first and second modules 120, 122 can be coupled to different planes of the same support bracket.

Figure 11:
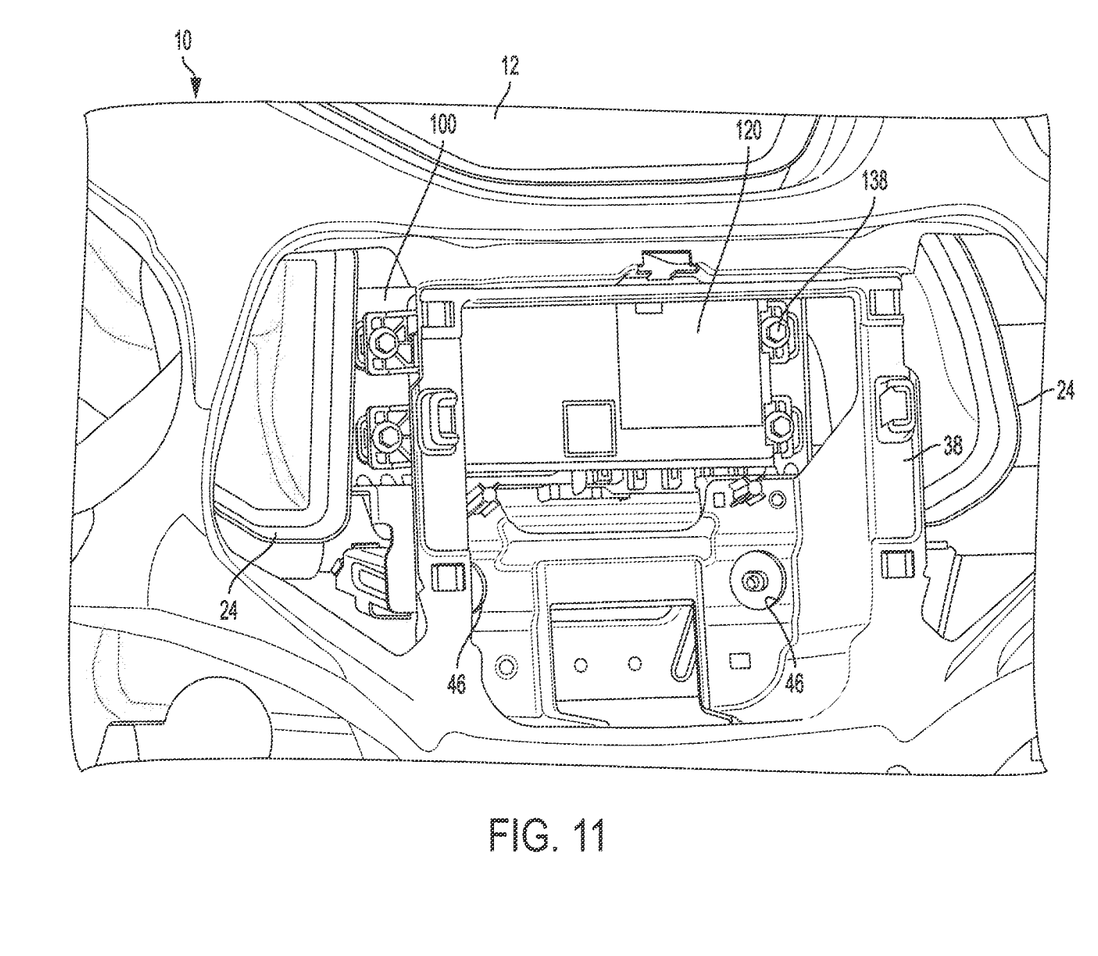
FIG. 11 is front perspective view of the instrument panel shown in FIG. 9 toward the vehicle engine in accordance with the principles of the present application.
Figure 12:
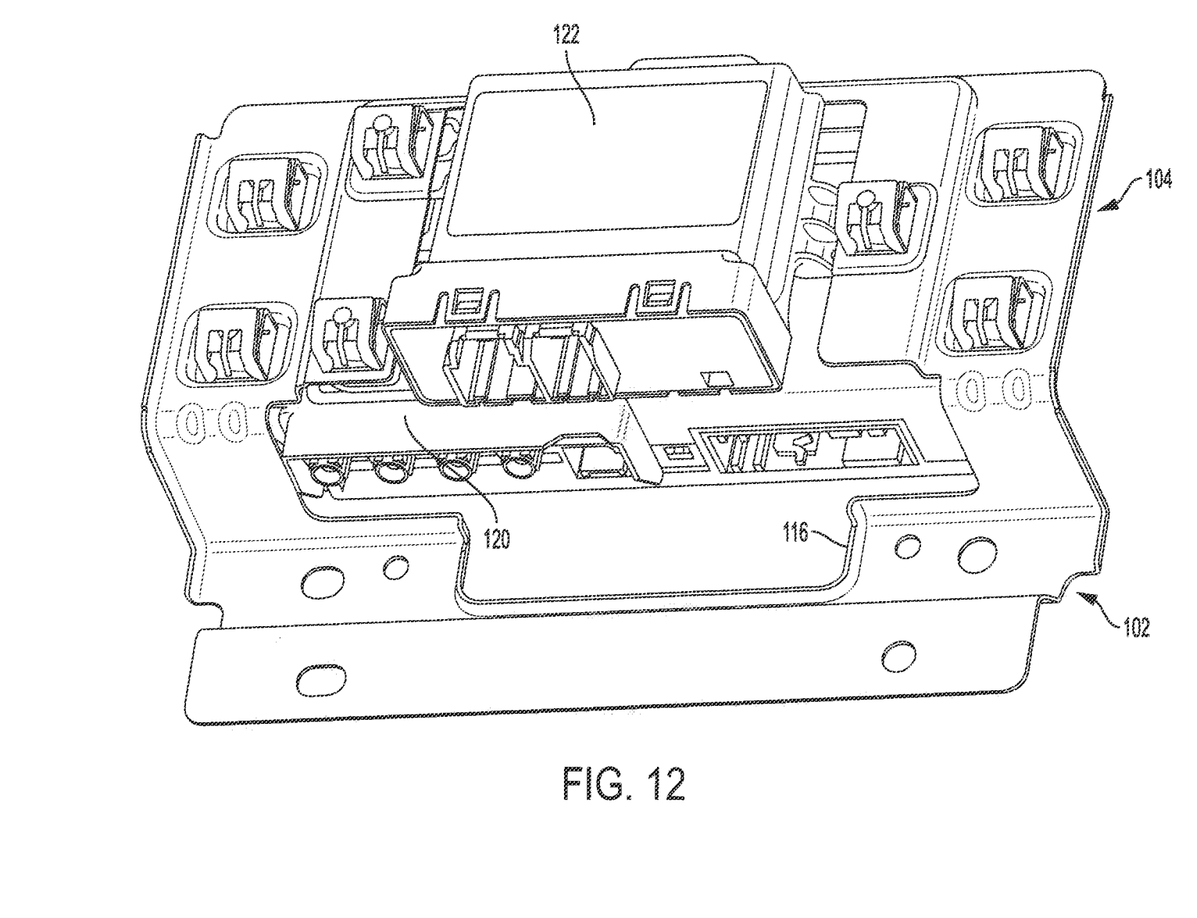
FIG. 12 is a rear perspective view of another example dual module support bracket in accordance with the principles of the present application.
Figure 13:
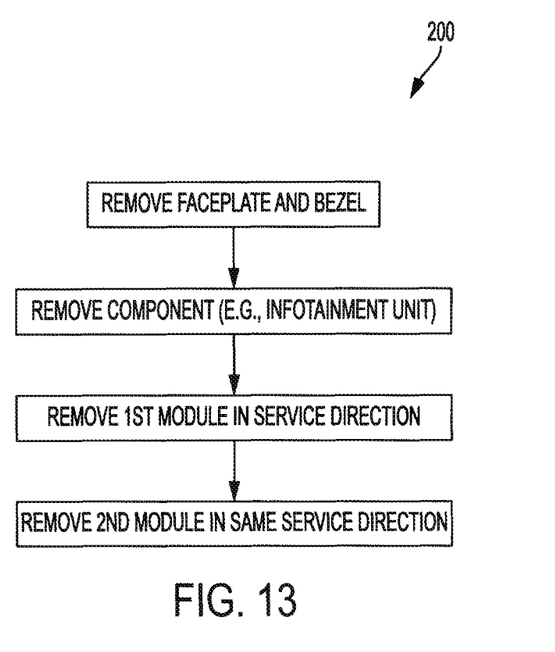
FIG. 13 is a schematic illustration of an example method of removing modules from a vehicle instrument panel in accordance with the principles of the present application.

FIG. 14 illustrates an example method 200 of servicing the first and second modules 120, 122. At step 202, control panel faceplate 30 and center stack bezel 34 are removed, thereby exposing infotainment system 22. At step 204, infotainment system 22 (or other component in front of module support bracket 100) is removed in a removal or first service direction 'R' generally toward the rear of the vehicle, thereby exposing the first module 120 (as shown in FIGS. 2 and 11). At step 206, first module 120 is removed, for example by removing fasteners 138. As such, the first module 120 may be removed in the first service direction 'R', thereby exposing the second module 122 (as shown in FIGS. 3 and 6).

At step 208, second module 122 is accessible and may be removed, for example, by removing fasteners 146. As such, the second module 122 may be removed in the first service direction 'R' through internal opening 142 and internal aperture 134. Accordingly, module support bracket 100 enables removal of both first and second modules 120, 122 in the same service direction 'R' through the same opening, thereby expediting and simplifying removal and servicing of modules 120, 122. To install modules 120, 122, the reverse order of steps are taken by inserting modules 120, 122 in an installation or second service direction 'I' opposite the first service direction.

Described herein are systems and methods for packaging electronics modules in a vehicle instrument panel. In one example, a module support bracket is stepped to define two different receiving surface planes. In this way, first and second modules can be coupled to the module support bracket while being arranged adjacent each other in a space conserving side-by side manner. This enables each module to be installed/removed in the same service direction through the same opening, thereby expediting and simplifying the removal and installation process. Moreover, only a single support bracket is required to couple the modules to a vehicle support structure, thereby reducing cost weight required for individual brackets for each module.

It will be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A module support bracket for an instrument panel of a vehicle, the module support bracket comprising:
   a first module receiving surface defining an internal aperture, the first module receiving surface configured to receive a first module; and
   a second module receiving surface arranged within the internal aperture on a different plane than the first module receiving surface, the second module receiving surface configured to receive a second module in a stacked relationship to the first module;
   wherein the second module is configured to be inserted through an opening in the instrument panel in an installation direction to couple the second module to the second module receiving surface, and the first module is configured to be subsequently inserted through the opening in the instrument panel in the installation direction to couple the first module adjacent the second module in a compact arrangement.

2. The module support bracket of claim 1, wherein the second module receiving surface defines an internal opening through which the second module at least partially extends when the second module is coupled to the second module receiving surface.

3. The module support bracket of claim 1, further comprising a securing portion coupled to the first module receiving portion, the securing portion configured to couple to a vehicle support structure.

4. The module support bracket of claim 3, wherein the securing portion comprises:
   an outwardly extending portion coupled to the first module receiving surface;
   a first front face portion coupled to the outwardly extending portion;
   a rearwardly extending portion coupled to the first front face portion; and
   a second front face portion coupled to the rearwardly extending portion.

5. The module support bracket of claim 4, wherein the first and second front face portions are substantially perpendicular to the outwardly extending portion and the rearwardly extending portion.

6. The module support bracket of claim 4, wherein the second front face portion includes a plurality of apertures to each receive a fastener to couple the securing portion to the vehicle support structure.

7. The module support bracket of claim 6, further comprising a coupling tab extending from the first module receiving surface, the coupling tab configured to couple to a storage bin of the instrument panel.

8. The module support bracket of claim 1, wherein the first and second module receiving surfaces are spaced apart such that the first and second modules are arranged side-by-side in close proximity when respectively coupled to the first and second module receiving surfaces.

9. The module support bracket of claim 8, wherein the first module surface is stamped to form the second module receiving surface and the internal aperture.

10. The module support bracket of claim 1, wherein the first module receiving surface includes a plurality of apertures configured to each receive a fastener to couple the first module to the first module receiving surface.

11. The module support bracket of claim 10, further comprising an offset defined around each aperture and configured to receive an attachment tab of the first module.

12. The module support bracket of claim 1, wherein the second module receiving surface includes a plurality of apertures configured to each receive a fastener to couple the second module to the second module receiving surface.

13. The module support bracket of claim 12, further comprising an offset defined around each aperture and configured to receive an attachment tab of the second module.

14. A vehicle comprising:
   an instrument panel;
   a structural member extending laterally across the vehicle behind the instrument panel;
   a vehicle component disposed in the instrument panel;
   a first electronics module;
   a second electronics module;
   a module support bracket disposed behind the vehicle component and coupled to the structural member, the module support bracket comprising:
      a first module receiving surface defining an internal aperture, the first module receiving surface configured to receive the first module; and
      a second module receiving surface arranged within the internal aperture on a different plane than the first module receiving surface, the second module receiving surface configured to receive the second module in a stacked relationship to the first module;
      wherein, upon removing the vehicle component, the second module is inserted through an opening in the instrument panel in an installation direction to couple the second module to the second module receiving surface, and the first module is subsequently inserted through the opening in the instrument panel in the installation direction to couple the first module to the support bracket adjacent the second module in a compact, stacked arrangement such that the first and second modules are positioned behind the vehicle component.

15. The vehicle of claim 14, wherein the second module receiving surface defines an internal opening through which the second module at least partially extends when the second module is coupled to the second module receiving surface.

16. The vehicle of claim 14, wherein the structural member is a cross-car beam having a support panel coupled thereto, the module support bracket coupled to the support panel.

17. The vehicle of claim 14, wherein the module support bracket further comprises a securing portion coupled to the first module receiving portion, the securing portion configured to couple to the support panel, the securing portion comprising:

an outwardly extending portion coupled to the first module receiving surface;
a first front face portion coupled to the outwardly extending portion;
a rearwardly extending portion coupled to the first front face portion; and
a second front face portion coupled to the rearwardly extending portion.

18. The vehicle of claim 14, wherein the vehicle component is an infotainment system, and wherein the vehicle component and the module support bracket are disposed in a center stack of the instrument panel.

\* \* \* \* \*